3,393,639
PYROTECHNIC IGNITER ASSEMBLY
Christopher W. Bolieau and Leonard D. Berchtold, Brigham City, Utah, assignors to Thiokol Chemical Corporation, Bristol, Pa., a corporation of Delaware
Filed Mar. 10, 1967, Ser. No. 622,170
2 Claims. (Cl. 102—70.2)

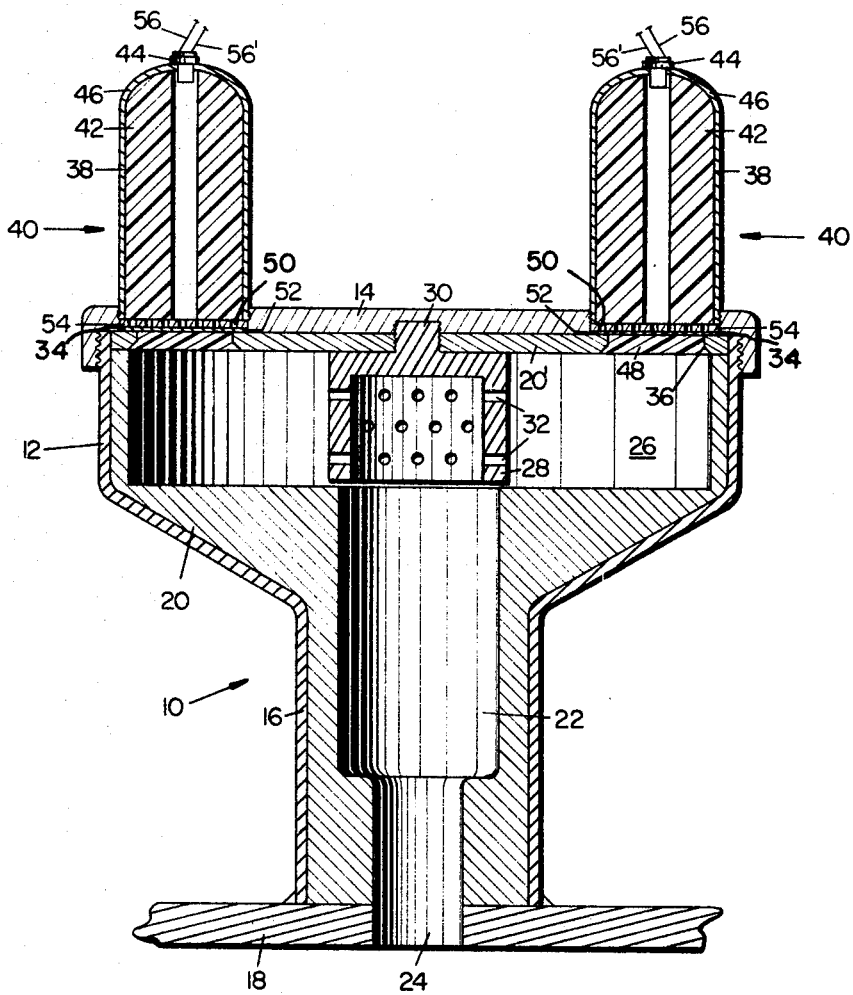
INVENTORS.
CHRISTOPHER W. BOLIEAU
LEONARD D. BERCHTOLD
BY Edwin D. Grant
ATTORNEY United States Patent Office 3,393,639
Patented July 23, 1968

ABSTRACT OF THE DISCLOSURE

A plurality of igniters are mounted on a housing having a single discharge outlet for hot gas generated by said igniters. Seal means are provided between the igniters and the housing so that each igniter can be fired without igniting unfired igniters.

---

This invention relates to a pyrotechnic igniter assembly and more particularly to an improved means for repeatedly igniting a rocket motor capable of being operated intermittently.

Heretofore solid propellant rocket motors designed for intermittent operation have been successively ignited by means of a plurality of igniters individually mounted on a rocket motor casing and adapted to discharge hot gas against a solid propellant grain disposed within said casing. Such an arrangement is undesirable because it requires a hole to be formed in a rocket casing for each igniter, thus increasing the difficulty of insulating the casing and decreasing the space available for mounting other equipment thereon. Furthermore, to maintain the structural integrity of a rocket casing, the number of holes formed in the wall thereof to receive igniters should be kept at a minimum.

Accordingly, it is an object of this invention to provide an igniter assembly by means of which hot gas can be successively injected into a rocket motor casing through a single hole in the wall thereof.

Another object of the invention is to provide a compact pyrotechnic igniter assembly for multiple ignition purposes.

Still another object of the invention is to provide a pyrotechnic igniter assembly comprising a plurality of igniters which can be separately fired without causing the ignition of unfired igniters of the assembly.

An additional object of this invention is to provide a multiple igniter assembly the igniters of which can be separately fired without ejection of solid debris from said assembly.

The aforesaid and other objects of the invention are attained by a preferred embodiment of the invention comprising a tubular housing one end of which is open and the other end of which is closed and formed with an increased diameter to provide a plenum chamber therein, a plurality of igniters mounted on said housing and arranged to discharge hot gas into said plenum chamber when fired, seal means adapted to seal the interior of each igniter from said plenum chamber until the igniter is fired, and means for preventing the ejection of the seal means from said housing with the gas discharged therefrom.

Details of the construction of the preferred embodiment of the invention will be given in the following specification, in which reference is made to the accompanying drawing which is a view taken along the longitudinal axis of the embodiment.

Throughout the specification and the drawing, like reference numbers designate like parts.

In the drawing the number 10 generally designates a hollow, cylindrical housing formed with a relatively large portion 12 closed by an end closure 14, and with a portion 16 of reduced diameter. For convenience in assembly of components, end closure 14 is threadedly attached to the cylindrical portion of housing 10, although in other embodiments of the invention the end closure could be an integral part of said housing. The pyrotechnic igniter assembly of which housing 10 is a part is particularly advantageous for use in rocket motors (although the igniter assembly can, of course, be employed in other applications), and thus the end of tubular portion 16 of housing 10 is illustrated as being fixedly attached by welding to the wall 18 of a rocket motor casing. The cylindrical portion of housing 10 is of double wall construction, the outer wall thereof being fabricated of a suitable metal, such as steel or an aluminum alloy, and the inner wall thereof consisting of a layer of thermal insulating material 20, preferably silica cloth impregnated with a phenolic resin, which is bonded to the outer wall by an adhesive or other means. A disk-shaped layer 20' of the same thermal insulating material is also bonded to the inner surface of end closure 14, and the inner surfaces of the thermal insulating layers 20, 20' together define a gas discharge orifice 22 that is aligned with an aperture 24 in wall 18 and a plenum chamber 26 that communicates with said discharge orifice. A hollow, cylindrical barrier 28 is disposed within plenum chamber 26 in coaxial relation with gas discharge orifice 22, this component comprising a support lug 30 which extends through a hole in insulating layer 20' and which is threadedly engaged within a hole formed in end closure 14. A plurality of holes 32 extend thorugh the wall of barrier 28, and there is a gap between the open end of said barrier and the inner wall 20 of housing 10.

Extending through end closure 14 are a plurality of holes 34 each of which is coaxially aligned with a respective one of a plurality of holes 36 extending through insulating layer 20'. For the purpose of identification in claims appended hereto, each pair of aligned holes 34, 36 is defined as an inlet in housing 10. Threadedly engaged within each hole 34 is one end of a casing 38 of an igniter generally designated by the number 40. Each igniter 40 comprises a centrally-perforated grain 42 of combustible material adapted to produce a high-temperature gas when it is ignited by means of an initiator 44 mounted in end closure 46 of the igniter casing 38.

A seal assembly is disposed within each of the inlets formed by respective pairs of the holes 34, 36, this seal assembly consisting of: (1) a plug 48 made of a resilient material such as rubber and removably disposed within hole 36; (2) a disk-shaped diaphragm 50 the peripheral portion of which is seated against a shoulder 52 formed at the juncture of the holes 34, 36; and (3) a disk-shaped, perforate support member 54 that abuts the side of said diaphragm 50 remote from plenum chamber 26. Preferably the plugs 48 are made of a resilient material such as rubber, the diaphragms 50 are made of aluminum foil, and support members 54 are made of a suitable metal such as an aluminum alloy. The thickness of each diaphragm 50 is selected so that the diaphragm will be ruptured, or burned away, by the gas generated by combustion of the grain 42 of the adjacent igniter 40.

It will be understood by persons skilled in the art of rockets that the above-described igniter assembly can be attached to the casing 18 of a rocket motor at such a position thereon that gas discharged through gas discharge orifice 22 will enter a perforation in a solid propellant grain (not shown) positioned within said casing. Electric current can be passed through leads 56, 56' connected to any one of the initiators 44 associated with igniters 40, so as to thereby ignite the initiator and discharge high-temperature gas into the associated casing 38, which in turn ignites the grain 42 in the latter. Gas generated by combustion of the grain 42 ruptures or burns the diaphragm 50, which normally seals the interior of the igniter from plenum chamber 26, and also blows plug 48 out of the hole 36 forming part of the inlet between said igniter and plenum chamber 26. High temperature gas then flows through holes 32 in barrier member 28 (and through the gap between the end of said barrier member and the surface of insulating layer 20) into gas discharge orifice 22 and thence into the interior of casing 18.

It is an advantage of the construction of the disclosed igniter assembly that the diaphragms 50 prevent gas in plenum chamber 26 from entering unfired igniters of the igniter assembly, so that each igniter 40 can be separately fired to repeatably ignite a grain disposed within casing 18. Although the pressure within plenum chamber 26 is high during the combustion of the solid propellant grain disposed within casing 18, support members 54 prevent displacement of diaphragms 50 and thus maintain the seals between unfired igniters 40 and said plenum chamber. Barrier member 28 retains plugs 48 within plenum chamber 26 when they are ejected from holes 36, and thus insures that only gas passes through gas discharge orifice 22.

Igniters 40 of the disclosed igniter assembly are mounted on housing 10 at points remote from casing 18, and consequently heating of the igniters by the hot thrust gas within said casing is considerably less than it would be if they were attached to the casing itself, as has been the practice heretofore. Furthermore, the arrangement of the insulating layers 20, 20' of housing 10 is such that heat flow through the wall of said housing is minimized. It has thus been found that the disclosed igniter assembly eliminates the problem of premature ignition of multiple igniters that has been experienced with igniters mounted directly on the casing of a rocket motor.

Numerous modifications of the igniter assembly disclosed and illustrated herein can be made without departing from the concepts of the present invention. For example, barrier member 28 can be replaced by a lattice of bars suitably disposed within plenum chamber 26 to prevent entry of plugs 48 into gas discharge orifice 22.

The scope of the invention is therefore to be understood as being limited only by the terms of the appended claims.

What is claimed is:
1. An igniter assembly comprising:
   a hollow housing forming a gas discharge orifice and a plenum chamber communicating therewith, a plurality of inlets extending through the portion of the wall of said housing that defines said plenum chamber, at least a portion of the wall of said housing being formed of a thermal insulating material to reduce heat flow in said wall in the direction of said inlets;
   a plurality of igniters mounted on said housing and each comprising a casing having an outlet aligned with a respective one of said inlets, a combustible, gas-generating material disposed within said casing, and means for igniting said combustible material at a selected time;
   a seal assembly disposed in each inlet in said housing and comprising a rupturable diaphragm extending across said inlet, a rigid, perforate support member abutting the side of said diaphragm remote from said plenum chamber, and a plug conformably seated within said inlet on the side of said diaphragm facing said plenum chamber; and barrier means disposed within said plenum chamber for preventing said plugs from entering said gas discharge orifice after they are removed from said inlets in said housing by gas generated within said igniters.
2. An igniter assembly as defined in claim 1, wherein said barrier means comprises a hollow, cylindrical member having a perforate wall and disposed in coaxial relation with said gas discharge orifice of said housing.

References Cited

UNITED STATES PATENTS

| | | | |
|---|---|---|---|
| 2,605,705 | 8/1952 | Millns et al. | 102—39 |
| 3,089,419 | 5/1963 | Pollard | 102—39 |

BENJAMIN A. BORCHELT, *Primary Examiner.*

T. H. WEBB, *Assistant Examiner.*